United States Patent [19]
Castel

[11] Patent Number: 5,797,662
[45] Date of Patent: Aug. 25, 1998

[54] PRESSURE-MODIFYING VALVE AND ELECTRIC BYPASS

[75] Inventor: Philippe Castel, Paris, France

[73] Assignee: Bosch Systems de Freingae, Drancy, France

[21] Appl. No.: 889,871

[22] Filed: Jul. 8, 1997

Related U.S. Application Data

[63] Continuation of Ser. No. 664,373, filed as PCT/FR94/00061 Jan. 19, 1994, abandoned.

[30] Foreign Application Priority Data

Feb. 12, 1993 [FR] France ............................ 93 01564

[51] Int. Cl.⁶ .................................................. B60T 8/26
[52] U.S. Cl. ............................ 303/119.2; 137/596.17; 303/115.2
[58] Field of Search ................. 303/115.2, 119.2, 303/113.1; 137/546.17; 251/121.19

[56] References Cited

U.S. PATENT DOCUMENTS

| | | | |
|---|---|---|---|
| 3,893,693 | 7/1975 | Skoyles | 303/115.2 |
| 4,138,165 | 2/1979 | Blomberg et al. | 303/115.2 |
| 5,042,885 | 8/1991 | Villec | 303/115.2 |
| 5,203,617 | 4/1993 | Wilde | 303/119.2 |
| 5,244,261 | 9/1993 | Ohe | 303/115.2 |
| 5,299,859 | 4/1994 | Tackett et al. | 303/119.2 |
| 5,333,945 | 8/1994 | Volz et al. | 303/119.2 |

*Primary Examiner*—Matthew C. Graham
*Attorney, Agent, or Firm*—Leo H. McCormick, Jr.

[57] ABSTRACT

A hydraulic valve having a housing with a piston located in a bore. The piston has a passage which connects an inlet chamber with an outlet chamber. A piston responds to a pressure differential between the inlet chamber and outlet chamber pressure and an outlet pressure by moving in the bore. A valve carried by the piston engages a needle to open communication through the passage and communicate fluid from the inlet chamber toward the outlet chamber. The needle extends from a core of an electromagnet, which responds to move the valve off a seat and open communication through the passage in opposition to a spring which urges the valve toward the seat and correspondingly control communication through the passage.

2 Claims, 1 Drawing Sheet

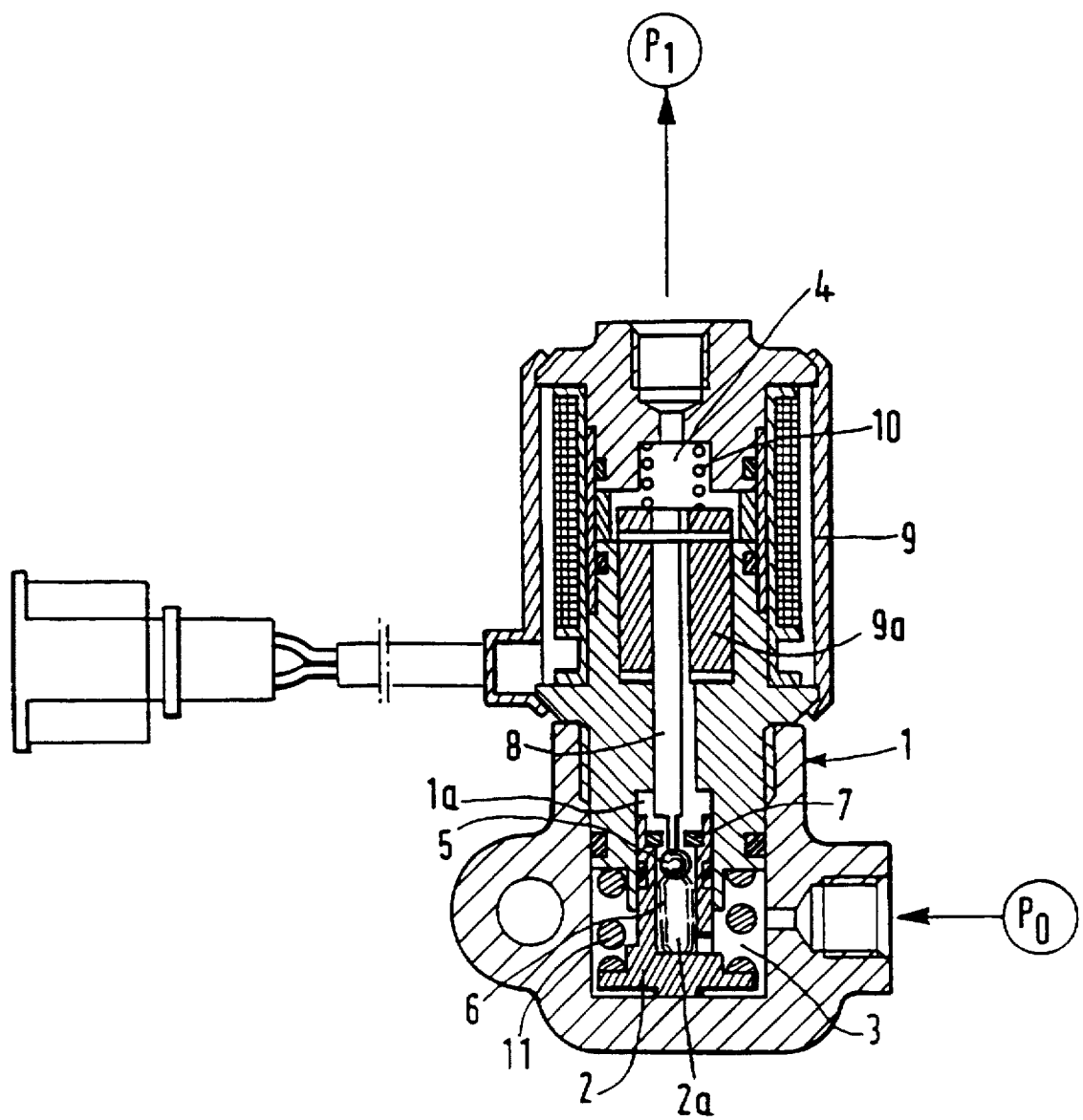

5,797,662

PRESSURE-MODIFYING VALVE AND ELECTRIC BYPASS

This application is a of continuation application Ser. No. 08/664,373, filed as PCT/FR94/00061 Jan. 19, 1994, now abandoned.

The present invention relates to a hydraulic solenoid valve capable of producing an outlet pressure which is modified relative to an inlet pressure supplied by a source of pressurized fluid. The valve has a casing provided with a bore; a piston sliding leaktightly in this bore. The piston along with the casing defines an inlet chamber which is connected to the source of pressurized fluid, and an outlet chamber connected to a use circuit for the outlet pressure, passage extends through the piston and a valve is installed in this passage for controlling the opening thereof. The valve functions as a shut-off member which is stressed elastically against a seat formed on the piston in this passage. A needle secured to a core of a solenoid projecting from the outlet chamber into the passage, so as, when desired, to lift the shut-off member off its seat and, correspondingly, to establish communication between the inlet chamber and the outlet chamber via the passage, this communication being established when the pressure in the inlet chamber exceeds a predetermined threshold.

A solenoid valve of this type has already been proposed in the prior art, as illustrated in the document EP-A-0,527,065, in particular for its application to motor vehicle brake systems equipped with at least one brake fluid circuit and with an electric brake circuit.

In spite of the considerable advantage of this prior proposal, which aims to obtain during operation a difference between the inlet pressure and the outlet pressure, it has become apparent that this differential pressure, which is undesirable when the system is at rest, could be eliminated only with relatively complex means.

The object of the present invention is to permit the elimination of this differential pressure with simple, inexpensive and highly reliable means.

To this end, the solenoid valve of the invention is essentially characterized in that the needle is moved by an electromagnet counter to a spring, and in that this spring pushes the needle back into a position in which it lifts the shut-off member off its seat continuously as long as the electromagnet is not activated.

Although document EP-A-0,434,201 already discloses a solenoid valve in which a needle can be actuated by various driving means, and in particular by an electric motor, these means as disclosed in this document, owing to the specific application envisaged, to adopt any position whatsoever in a continuum of possible stable positions.

Thus, in the event of a failure in these driving means, the needle can adopt any position whatsoever in this continuum, and any residual pressure difference between the inlet and outlet chambers is not necessarily eliminated, in contrast to that which is the case in the invention.

Other features and advantages of the invention will become apparent from the description thereof given below by way of a guide and with no limitation being implied, with reference to the attached drawing, the single figure of which is a sectional view of a solenoid valve according to the invention.

The solenoid valve has : a casing 1 provided with a bore 1a. A piston 2 is slidingly retained in a leaktight manner in this bore to define an inlet chamber 3 which is connected to a source of pressurized fluid Po and an outlet chamber 4 which is connected to a use circuit for the outlet pressure P1.

A passage 2a extends though piston 2 with a valve installed therein through the piston; a valve installed in this passage for controlling the communication of fluid therethrough. The valve includes a ball 5 which is urged elastically by a spring 6 against a seat 7 formed on the piston in the passage 2a. A needle 8 extends from a core 9a of an electromagnet 9 and projects from the outlet chamber 4 into the passage. Needle 8 is designed to when desired, to lift the ball 5 off seat 7 and, correspondingly, to establish communication between the inlet chamber 3 and the outlet chamber 4 via the passage 2a.

The needle 8 is integral with the core 9a of an electromagnet 9, this core being pushed towards the ball 5 by a spring 10.

Piston 2 is pushed back against or urged toward the inside of the casing 1, in a direction which in contrast tends to move the ball 5 away from the needle 8.

Nevertheless, the needle 8 is designed with a length such that the needle lifts the ball 5 off its seat 7 when the electromagnet is not activated and as a result the inlet chamber 3 and outlet chamber 4 communicate freely with each other continuously, such that the pressures prevailing in these equalize.

When the solenoid valve is first operating and throughout the time of its use, the electromagnet 9 is activated, which causes the core 9a to move translationally towards the outlet chamber 4, such that needle 8 is retracted, and the valve formed by the ball 5 and the seat 7 is closed by the action of spring.

Under these conditions, the passage 2a is closed and the rise in the inlet pressure Po causes the piston 2 to move translationally inside the bore 1a counter to the force exerted by the spring 11.

When the difference in the inlet and outlet pressures reaches a threshold determined by the stiffness of the spring 11, its initial stress and the travel of the needle 8, the latter again lifts the ball 5 off the seat 7, and the outlet pressure P1 is established at a value represented by that of the inlet pressure minus this threshold.

I claim:

1. A hydraulic solenoid valve capable of producing an outlet pressure modified relative to an inlet pressure supplied by a source of pressurized fluid, said valve comprising: a casing having a bore therein; a piston slideably located in a leaktight manner in said bore, said piston engaging casing to define an inlet chamber and an outlet chamber, said inlet chamber being connected to the source of pressurized fluid and said outlet chamber being connected to a use circuit for the outlet pressure; said piston having a passage through which said inlet chamber is connected to said outlet chamber, a valve located in said passage for controlling flow of fluid therethrough, said valve including a shut-off member which is stressed elastically toward a seat formed in said passage of said piston; and a needle projecting from said outlet chamber into said passage for lifting said shut-off member off said seat to correspondingly establish communication between said inlet chamber and said outlet chamber through said passage, said communication being established when pressure in said inlet chamber exceeds a predetermined threshold, characterized in that a core of an electromagnet linearly moves said needle counter to a spring to hold associated with said shut-off member off said seat and to establishes communication through said passage in response to an input signal, said spring continually urging said shut-off member off said seat as long as said electromagnet is not activated to instantaneously position said needle to correspondingly control the communication between said inlet chamber and outlet chamber.

2. A hydraulic solenoid valve capable of producing an outlet pressure modified relative to an inlet pressure supplied by a source of pressurized fluid, said valve comprising: a casing having a bore therein; a piston slidable in a leaktight manner in said bore, said piston engaging said casing to define an inlet chamber and an outlet chamber, said inlet chamber being connected to the source of pressurized fluid and said outlet chamber being connected to a use circuit for the outlet pressure; said piston having a passage through which said inlet chamber is connected to said outlet chamber, a valve located in said passage, said valve including a shut-off member which is stressed elastically in a closing direction toward a seat formed in said passage of said piston for controlling flow of fluid through said passage; an electromagnet; and a needle projecting from said outlet chamber into said passage, said needle being selectively moved away from the shut-off member by said electromagnet and permanently biased by a first spring toward said shut-off member in an opening direction opposite to said closing direction so as to lift said shut-off member off said seat and establish communication between said inlet chamber and said outlet chamber by way of said passage, said piston being elastically stressed away from said needle by a second spring acting against a force which correspondingly increases with said inlet pressure, said needle continuously lifting said shut-off member off its seat as long as the electromagnet is not activated.

* * * * *